United States Patent [19]

Martin

[11] 3,795,311

[45] Mar. 5, 1974

[54] MOUNTING ASSEMBLY FOR VIBRATING SCREEN DECK

[75] Inventor: Robert A. Martin, Cottage Grove, Minn.

[73] Assignee: Universal Oil Products Company, Des Plaines, Ill.

[22] Filed: Mar. 23, 1973

[21] Appl. No.: 344,408

[52] U.S. Cl.............. 209/395, 209/399, 209/403, 209/405
[51] Int. Cl.............................. B07b 1/42
[58] Field of Search... 209/393, 394, 395, 396, 397, 209/398, 399, 400, 401, 402, 403, 404, 405

[56] References Cited
UNITED STATES PATENTS

| 3,203,548 | 8/1965 | Rovbal............................ 209/399 |
| 3,508,650 | 4/1970 | Carr................................. 209/399 |
| 1,290,906 | 1/1919 | Campbell....................... 209/399 X |
| 3,092,573 | 6/1963 | Lambert et al................. 209/403 |
| 889,380 | 6/1908 | Lampson......................... 209/405 |

*Primary Examiner*—Harrison L. Hinson
*Attorney, Agent, or Firm*—James R. Hoatson, Jr.; Barry L. Clark; William H. Page, II

[57] ABSTRACT

Pin and wedge mounting assembly for flat deck screen panels used on a vibrating screen deck provides secure locking of the screen panels while permitting rapid assembly and disassembly of the assembled components. The pin is slotted for receipt of the wedge and the wedge has an enlarged head which is of a greater width than the pin. The enlarged head serves to deflect product flowing along the screen away from the pin, thus preventing or greatly reducing wear of the pin and the operative surfaces of the wedge. In abrasive applications such as mining, the head of the wedge and the pin are preferably covered with inexpensive, replaceable caps of an abrasion resistant material such as polyurethane, polypropylene or neoprene.

14 Claims, 3 Drawing Figures

MOUNTING ASSEMBLY FOR VIBRATING SCREEN DECK

BACKGROUND OF THE INVENTION

The invention relates to vibrating screen decks and particularly to devices for mounting vibrating screens of the type used in industries such as mineral processing, food processing and petrochemicals. Johnson U.S. Pat. No. 3,101,314 is illustrative of several prior art mounting devices, including wedges, bolts, and J-bolt assemblies which have been used to anchor screens to screen decks.

In applications where abrasive particles pass over the screens, the screens and the mountings therefore are subject to rapid wear, necessitating frequent replacemnt. Where nut and bolt fastening systems are used, the wearing away of the corners of nut or bolt head by abrasive particles maks it especially difficult and time consuming to replace a screen although damage to such nut and bolt members can be reduced by welding deflector shields to the clamping plate upstream of each bolt. Deflector shields cannot be effectively used with wedge-type fasteners since they would interfere with the driving of the wedge if placed close enough thereto to be effective as a deflector. A particular disadvantage of bolt-type fastening systems is the time required to assemble and disassemble them, especially when they have corroded. Furthermore, trade union work rule requirements often require that highly skilled labor be used to tighten bolts whereas wedges can be tightened by laborers using hammers.

SUMMARY OF THE INVENTION

It is an object of this invention to provide a mounting assembly for anchoring a screen to a vibrating screen deck which has not only a much longer life than previously used mounting arrangements but also has the ability to be rapidly assembled and disassembled by unskilled workmen.

The improved mounting assembly comprises a pin which is adapted to be affixed at one end to a vibrating screen deck. Positioned near the opposite end of the pin is a longitudinally extending transverse slot which is adapted to receive the tapered wedge portion of a wedge member. The pin is adapted to extend through an opening in a clamping plate or tie down member which is spaced from the screen deck by the screen panel to be retained and by a resilient strip. To lock the panel to the deck, the wedge member is driven into the opening until the resilient strip is partially compressed. The wedge member is formed with a head portion much wider than the wedge portion and at least as wide as the pin so that particles traveling along the screen panel will be deflected away from the wedge portion and pin. Where the environment is abrasive, such as where minerals are processed, the head portion of the wedge and the exterior surface of the pin is preferably protected by a replaceable cover of an abrasive resistant material such as polyurethane, polypropylene or neoprene. To insure that the wedge will remain parallel to the direction of particle flow, the tie down member may be provided with wedge rotation prevention elements such as studs or bars positioned closely adjacent to the desired path of travel of the wedge.

DESCRIPTION OF THE PREFERRED EMBODIMENTS

Figure 1:
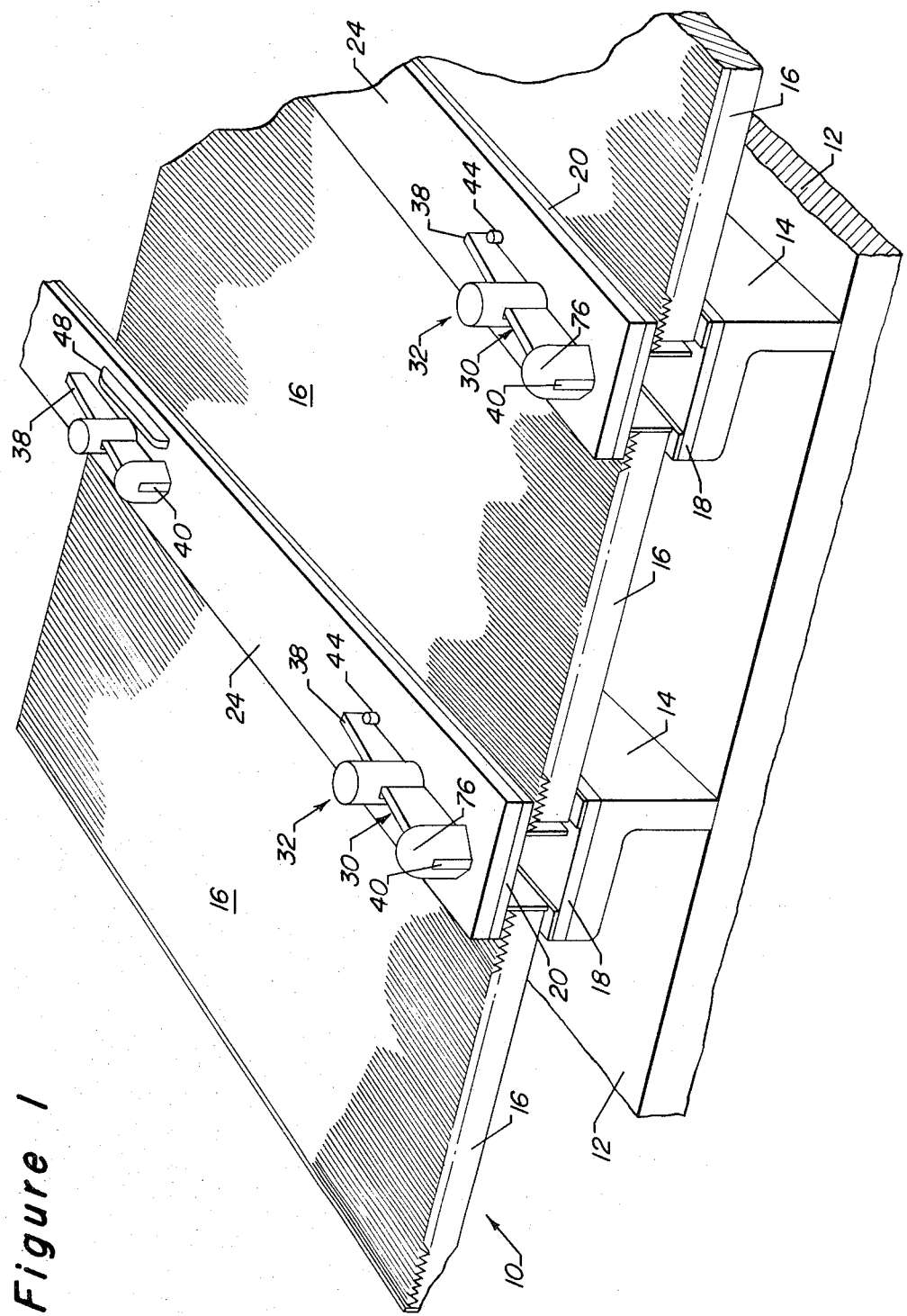
FIG. 1 is a perspective view showing the improved mounting assembly in combination with a plurality of screen decks.

Referring to FIG. 1, a vibrating screen deck assembly is indicated generally at 10. The deck assembly 10 includes a vibrating screen deck frame 12, deck support members 14, and screen decks 16. A resilient strip 18 of a material such as neoprene is positioned under the decks 16 and on top of the support members 14. A similar resilient strip 20 is positioned above the decks. A clamping or tie-down plate 24 is forced downwardly to compress the resilient strips 18,20 by a wedge assembly indicated generally at 30. The wedge assembly 30 comprises a pin portion 32 having an opening 34 into which a tapered wedge member 38 is driven by force applied to its head portion 40. In order to insure that the wedge member 38 is maintained aligned with the flow of material along the screen decks 16, as indicated by the arrow, a pair of studs 44 may be provided in the clamping plate 24. An alternative structure for preventing rotation of the wedge member 38 is shown in FIG. 1 and comprises an elongated bar 38 which also serves to strengthen the clamping plate 24 where it is weakened by being apertured to accept the pin 32.

Figure 2:
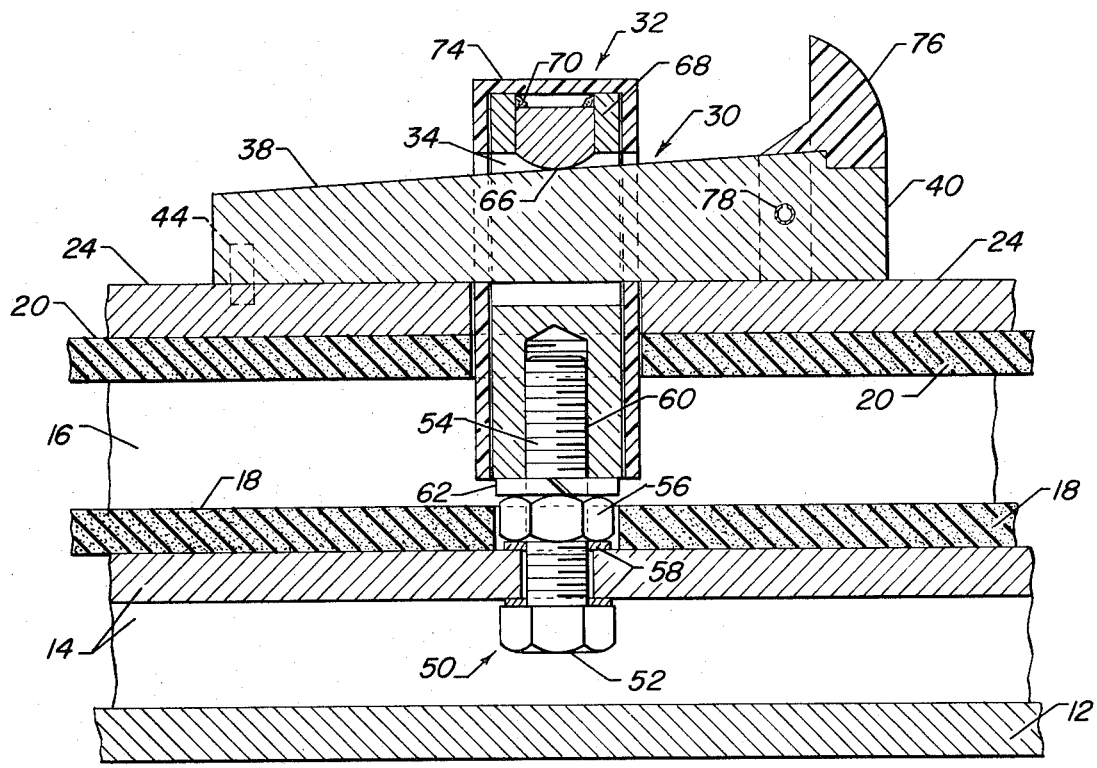
FIG. 2 is a side view of the improved pin and wedge, taken on line 2—2 of FIG. 3.

The details of the wedge assembly 30 are shown in FIG. 2. The pin portion 32 of the wedge assembly is mounted to the vibrating frame 14 by means of a threaded bolt 50 having a head 52 and a threaded end portion 54. The bolt 50 is firmly locked to frame 14 by nut 56 and a pair of lock washers 58. The threaded end 54 of bolt 50 engages threads 60 formed in the interior pin 32. The pin 32 can be locked against rotation by lock washer 62. If it is desirable to adjust the pin 32 upwardly, the pin can be partially unscrewed from bolt portion 52 and locked against rotation in various ways, such as by adding shims or washers (not shown) to bear against lock washer 62, using a bolt with a nylon insert, or by relying on the studs 44 and the compression of resilient strips 18,20. The adjustment feature makes it possible to clamp screen deck panels of various thicknesses.

Clamping loads are applied to the pin 32 by the wedge member 38 through contact member 66 which is integrally attached to the pin body 68 by weld bead 70. Contact member 66 extends into opening 34, thereby insuring that the wedge member 38 cannot touch the top of openings 34 and further insuring that the pin 32 will receive its loading uniformly at its center.

Since the wedge assembly 30 is often used in a vibrating screen deck arrangement wherein abrasive particles are in contact with the deck panels 16, it is desirable that the wedge assembly be protected from damage. This can be accomplished by providing the pin 32 and wedge head 40 with easily replaceable, abrasion resistant deflector caps or covers 74,76 respectively, of a material such as rigid polyurethane, polypropylene or neoprene. The wedge cover 76 can be held by a spring locking pin 78.

Figure 3:
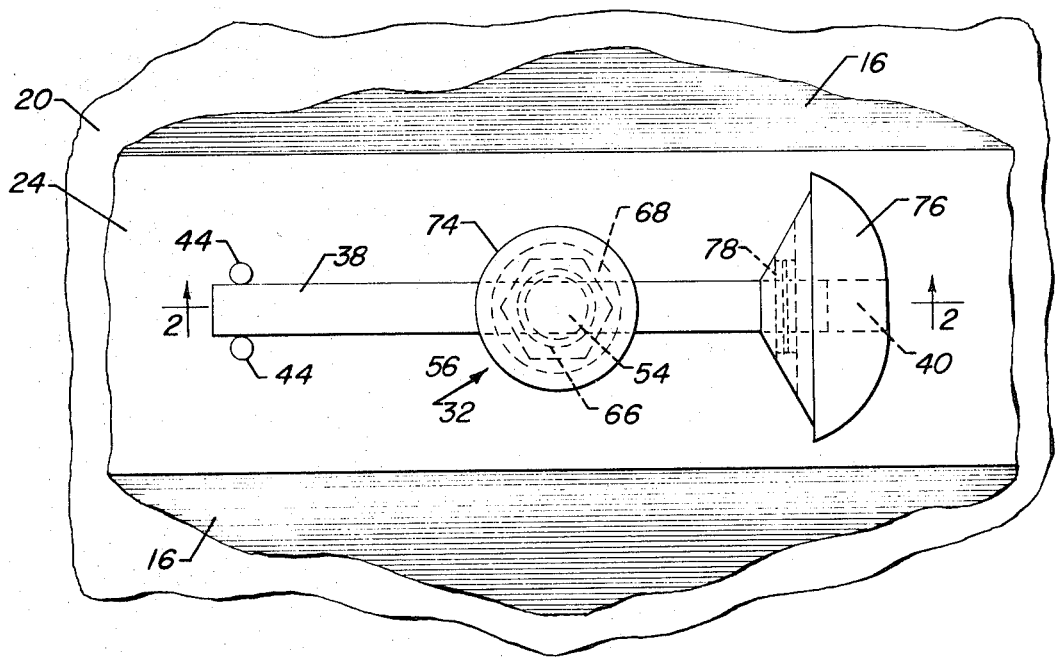
FIG. 3 is a top view of the improved mounting assembly.

As can be seen in FIG. 3, the wedge head 40 and its cap 76 have a greater width than the pin 32. This size relationship permits abrasive particles traveling along the screen decks 16 to be deflected without requiring that separate deflector plates be welded to the clamping plate 24 as is true in the prior art. Where particles being carried by the screen decks 16 are non-abrasive or where food handling regulations would prevent the use of plastic covers on the wedge members, the wedge members 30 can be integrally formed with large metal heads of a shape similar to the plastic caps 76.

I claim as my invention:

1. In a vibrating screen deck assembly comprising spaced support members for supporting at least one screen panel and at least one clamping plate thereon, the improvement comprising at least one pin member mounted at one of its ends to at least one of said support members, said pin member having a transverse opening therethrough which is axially spaced from its free end, a wedge member, said wedge member including an elongated tapered wedge portion adapted to be received in said transverse opening and an enlarged head portion having a transverse width greater than the width of said pin, said enlarged head serving to deflect particles which are carried on the screen panel or clamping plate in a direction parallel to the length of the wedge portion so that the particles tend to avoid contact with either the wedge portion or the pin, said wedge member overlying said clamping plate which in turn overlies said screen panel to cause said screen panel to be tightly clamped against said at least one support member.

2. A screen deck assembly in accordance with claim 1 wherein said enlarged head portion of said wedge member is covered by a replaceable cap member.

3. A screen deck assembly in accordance with claim 2 wherein at least a portion of said pin is covered by a replaceable cap member.

4. A screen deck assembly in accordance with claim 2 wherein said cap member is made of an abrasion resistant material.

5. A screen deck assembly in accordance with claim 4 wherein said abrasion resistant material is resilient.

6. A screen deck assembly in accordance with claim 1 wherein said clamping plate is metallic and includes means for restricting the rotation of said wedge member.

7. A screen deck assembly in accordance with claim 6 wherein said rotation restricting means comprises a pair of studs extending upwardly from said clamping plate at a distance from said pin.

8. A screen deck assembly in accordance with claim 6 wherein said rotation restricting means comprises at least one elongated bar welded to said clamping plate adjacent a side of said wedge portion.

9. A screen deck assembly in accordance with claim 1 wherein said pin is adapted to be mounted in a plurality of predetermined axial positions relative to said at least one support member.

10. A screen deck assembly in accordance with claim 9 wherein said pin is mounted by thread means.

11. A screen deck assembly in accordance with claim 1 wherein a resilient strip is positioned between said clamping plate and said screen panel.

12. A screen deck assembly in accordance with claim 11 and further including a resilient strip between at least one of said support members and said at least one screen panel.

13. A screen deck assembly in accordance with claim 1 wherein said pin includes an internal abutment member extending into said transverse opening sufficiently to engage said wedge portion and to prevent said wedge portion from engaging the upper outer edges of said pin, whereby the clamping load exerted on said abutment member by said wedge will be relatively evenly distributed throughout the body of said pin.

14. A screen deck assembly in accordance with claim 13 wherein said abutment member has a curved end profile which is tangentially engaged by said wedge portion.

* * * * *